United States Patent [19]

Dell

[11] 4,174,281

[45] Nov. 13, 1979

[54] COUNTERCURRENT DECANTATION

[75] Inventor: Christopher C. Dell, Leeds, England

[73] Assignee: National Research Development Corporation, London, England

[21] Appl. No.: 901,616

[22] Filed: May 1, 1978

[30] Foreign Application Priority Data

May 3, 1977 [GB] United Kingdom ............... 18453/77

[51] Int. Cl.$^2$ ............................................. B01D 21/10
[52] U.S. Cl. ..................................... 210/83; 210/521; 210/534; 210/540
[58] Field of Search ................. 210/83, 513, 519, 521, 210/522, 532 R, 533, 534, 535, 537, 538, 539, 540; 209/158–161, 208, 491, 496; 137/172, 433

[56] References Cited

U.S. PATENT DOCUMENTS

| | | | |
|---|---|---|---|
| 1,123,011 | 12/1914 | Ripley | 210/534 |
| 1,199,099 | 9/1916 | Münzer | 210/521 |
| 1,344,370 | 6/1920 | Allen . | |
| 2,230,386 | 2/1941 | Pecker | 210/521 |
| 2,850,439 | 9/1958 | Bodkin . | |

FOREIGN PATENT DOCUMENTS

268663 4/1927 United Kingdom .
990886 5/1965 United Kingdom .
1153504 5/1969 United Kingdom .

*Primary Examiner*—Frank Sever
*Attorney, Agent, or Firm*—Oblon, Fisher, Spivak, McClelland & Maier

[57] ABSTRACT

In countercurrent decantation, upwardly flowing liquid is treated with downwardly falling solids in a progressive series of vertically stacked treatment cells. Solids fall through a valve from one cell to the next. The valve is a buoyant sphere which will sink, to open, under a weight of solids, but the valve is sufficiently buoyant to close when there is still enough solid queuing thereon to prevent liquid from passing through it.

14 Claims, 10 Drawing Figures

COUNTERCURRENT DECANTATION

This invention relates to a countercurrent decantation method and apparatus for treating solids with liquids.

When a valuable metal is leached from its ore by dissolution in acid to leave barren solids, the solids are usually then treated with a washing liquid to separate them from residual pregnant liquor retained in voids between particles of the solids. This treatment is commonly by countercurrent decantation, that is by causing a stream of washing liquid, which is initially relatively barren, to flow in countercurrent to a stream of the solids. This countercurrent decantation is continued until the liquor left in the voids is too dilute to be worth recovering. Although this is a well established process, difficulties arise when passing solids, especially slow-settling slimy ones, in order through successive thickeners (each of which is treated by liquid overflowing from the next thickener in order). The thickeners have to be large and hence costly. Even so, a large number of thickeners is found to be necessary if a good overall separation is required.

According to the present invention a method of countercurrent decantation comprises passing a solid by gravity from a first cell into a second cell (normally directly below the first cell) through a valve, and passing a liquid upwardly from the second cell into the first cell other than through the valve, whereby the solid is treated with the liquid, the valve being responsive to the amount of solid thereon to open when more than a certain amount of solid is thereon and to close while there is still enough solid thereon to prevent any mixing of liquid in the second cell with liquid from the first cell.

The method preferably further comprises passing the solid by gravity from the second cell into a third cell (normally directly below the second cell) through a valve, and passing the liquid upwardly from the third cell into the second cell, other than through the valve, before passing the liquid from the second cell into the first cell, the valve being responsive as already defined.

The present invention further comprises countercurrent decantation apparatus comprising a first cell and a second cell interconnected by a valve responsive to the amount of solid thereon to open, for passing the solid by gravity from the first cell into the second cell, when more than a certain amount of solid is on the valve and to close while there is still enough solid thereon to prevent bulk mixing of liquid in the second cell with liquid from the first cell, the first cell and the second cell also being interconnected by a liquid passage means. The apparatus preferably further comprises a third cell interconnected to the second by a valve responsive as already defined the second cell and the third cell also being interconnected by a liquid passage means.

The plurality of cells is conveniently provided by dividing an upright column with a generally horizontal divider comprising one or more such valves. The solids can be passed downwardly and the liquid upwardly through such a column. The column may conveniently consist of more than three, and preferably more than four cells, for example five or more cells. For most uses, however, it is unnecessary to have as many as ten cells, the number more usually being from four or five to nine. It will be appreciated, however, that for a particularly difficult decantation (e.g. flocculated solids are more difficult than granular solids) the cells could be increased to any desired number, the controlling factor being the balance between the increased separation achieved by each extra cell and its cost. In each case, adjacent cells are interconnected by a respective valve, and also by a liquid passage means.

The present invention may be applied to various forms of liquid-solid treatment. Thus, although it is of particular interest for the separation of pregnant liquors from barren solids, or vice versa, e.g. with colliery washings, where particles of −200 mesh have to be washed of pollutants and thickened to facilitate discharge to waste tips, it may also be applied, for example, to the treatment of a solid with a liquid to effect solution of a part of that solid in the liquid, e.g. leaching copper ore, or countercurrent extraction such as of oil from seeds. Other applications of countercurrent decantation include catalytic converters, elutriation columns, wastewater treatment and clarification and selective flocculation. In any application, however, efficient operation of the column of cells requires a concentration gradient of the solute, of whatever kind, in the liquid over the height of the column. Preferably, therefore, both the valve and the liquid passage means for passing liquid upwardly are such as to provide a steady flow of each with avoidance of any undue turbulence. In achieving this, the form of valve is of particular importance.

The valve conveniently comprises a barrier member capable of limited movement allowing the passage of thickened solid. In use, with solid being fed into the top of the column, a layer of solid of substantially constant thickness is built up on top of the valve and solid is passed through the valve into the cell beneath at substantially the same rate as solid falls on to the valve from the cell above. It is also desirable that the distribution of solid falling through a cell is relatively even across the cell and thus on the valve at the bottom of the cell, and for this reason each cell is preferably interconnected to the next by a plurality of valves, which may form an array on the horizontal divider.

The optimum depth of solid on the valve will depend on the type of solid-liquid treatment being effected. As a general guide, however, it may be stated that whilst more stages are usually required the thinner the sediment, it is more difficult to achieve an even flow of solid through the valves as the thickness of the sediment is increased and these two factors must be balanced in selecting a suitable depth of solid in any instance. The valve may be controlled by some form of sensing device responsive to the amount (for example, the weight or the thickness) of solid on the valve. For weight-sensing, a simple load sensing device may be used, whilst for thickness-sensing an optical, ultrasonic or electrical conductivity across the solid. A second form of valve comprises a hinged member so that discharge of solid through the valve may be effected by tilting of the member. Such a valve may comprise, for example, a series of hinged rods. Thus, the valve may have a plurality of parts at least some of which are movable in relation to adjacent parts.

In all these cases, it is essential that the valve should close while there is still enough solid on it effectively to seal it, that is, to prevent any mixing of liquid in one cell with liquid from the next cell. In the examples of valve described, this could be achieved by adjusting the null-point of the load-sensing or thickness-sensing device, or applying a moderately strong return spring to the hinged member. The valve may comprise a plurality of rods movable in relation to a fixed structure shaped to co-operate with the rods so that motion of the rods away from the fixed structure creates apertures through which solid can pass. In one embodiment, therefore, the fixed structure provides a series of slots running transversely separating two cells, the slots being obturable by the movable rods beneath them. In an alternative embodiment of a somewhat similar type, the fixed structure provides a series of circular apertures which are obturable by location of movable spheres beneath the holes.

It is possible to construct these valves in a variety of ways. Preferably, however, the valve is such that, in use, movement of the movable parts thereof occurs in response to downward pressures exerted by the weight of solid collected upon the valve. Preferably, the movable part or parts of the valve are maintained in position at the top of the cell during use by their buoyancy in the liquid filling the cells. Where the valve comprises a fixed part or parts these will generally prevent upward movement of the movable part or parts into the cell above but in other cases constraining means may be provided for this purpose. Constraining means are also conveniently provided to retain the movable part or parts near the top of the cell when the apparatus is not in use, in particular if the movable parts are buoyant members and the apparatus is emptied of liquid. Considering first the possibility that the spaces between fixed parts are linear, having the form of slots, so that the movable parts themselves are of linear form, the valve may thus comprise a plurality of rods mounted generally horizontally (and, usually, parallel) separating two cells. The rods may be of any various cross-sectional forms, for example circular, rhomboidal, rectangular or kite (long axis upright), or may have the general form of a hipped roof. Buoyancy of the rods is restrained by the fixed parts which may have the form of plates converging upwardly to leave a gap smaller than the width of the rod. It has been found advantageous to guide the solids towards the gaps, and thus, preferably, upwardly of the convergence the plates continue parallel upwardly and then diverge. They may diverge so far as nearly to meet the plates associated with the adjacent rods, leaving a slit able to pass liquid upwardly. If the slit is suitably narrow, the liquid will pass upwardly fast enough to prevent solids in practice from falling downwardly through it. In a modification, the plates may diverge upwardly immediately above the rod, and resilient flaps (e.g. of rubber) may be attached to the lower edges plates for sealing against the rod; such flaps can accommodate slight irregularities that might otherwise cause leakage of the valve.

Considering now the alternative embodiment, wherein the fixed structure provides circular apertures obturable by spheres, which are preferably buoyant, each cell may be interconnected with the next by a single aperture-plus-sphere, or by an array of apertures each with a sphere. Above the sphere, there may be an upwardly diverging frustum (with smaller diameter less than the diameter of the sphere) to guide falling solids to the sphere. At the lower edge of the frustum there may be joined a downwardly diverging frustum optionally terminating in a restraint such as a horizontal grill or mesh to contain the sphere when the apparatus contains no liquid.

As indicated above, appropriate mobility is preferably imparted to the movable part or parts of the valve, by making them of a suitable buoyancy relative to the liquid intended to be used in the cells. This aspect of the invention will be particularly discussed in relation to the use of rods and spheres but also applies to movable parts in other forms. Selection of suitable buoyancy is important in order to avoid on one hand an excessive build-up of solid on rods or spheres which are too hard to displace (i.e. too buoyant) and on the other hand an excessive rate of discharge of solid from rods which are too easy to displace (i.e. insufficiently buoyant). A rod can remain buoyant despite considerable thickness of solid on it if the solid has built up on a portion of the rod only. If this tendency is noted to a significant extent despite attempts to produce an even solid distribution, for example by having the rods in one cell lying at right angles to the rods in the next cell, the problem may usually be overcome by decreasing the buoyancy of the rods, and is in any case less prevalent with spheres. Whilst differing buoyancies will be appropriate to the treatment of differing pulps it may be stated, as a guide, that a range of density of from about 0.5 to 0.9, for example 0.55, 0.80 or 0.89, of the density of the liquid in the vicinity of the rod or sphere has been found appropriate in many instances. Plastics materials are particularly suitable for the construction of the rods, which may be constructed with a hollow interior to decrease the overall density, the density being increased as required by placing inserts e.g. of metal into the hollow interior. The rods preferably conform substantially to linearity and parallel arrangement, to assist even packing of the rods. In constructing the rods, therefore, their dimensions should conveniently be such in relation to the material from which they are constructed as to enable this linearity to be maintained in use. It has been found that the rods are less likely to become jammed against the walls of the cell if their ends are substantially either hemispherical or, preferably, conical in shape; the 'hipped-roof' arrangement of rod is also somewhat resistant to jamming. A sphere is indeed a rod of infinite shortness with hemispherical ends.

In practice, the barriers are conveniently readily removable from the cells. Thus, for example, fixed members such as slats may be arranged in a frame or module which can be inserted between cells as a whole and rests on supporting members running transversely across the lower cell on opposite interior walls thereof. The gaps between the slats are obturable by the rods. The frame or module may alternatively consist of an array of holes formed in a sheet (which may be contoured to guide solids to the holes.)

The liquid for treating the solid is conveniently fed into the lowest cell by means of a pump, at a rate of flow controlled, for example, in response to a device which measures the rate of upflow from the cell receiving the liquid to that above it, conveniently in an automatic manner. The liquid is conveniently taken off from the uppermost cell, for example by allowing the liquid to overflow the rim of the column into a channel running around the top of the column provided with a suitable drain.

The solid is conveniently fed into the uppermost cell of a column through some form of passage means which directs the solid into a feed distributor in order to distribute it over the available area of the cell. If desired, the uppermost cell may widen out at the top so that the cell has the form of a hopper, thereby increasing the cross-sectional area at the top of the cell but not at the bottom so that no increase in divider size is necessitated. Then the solids (especially if fed wet to the column) may be directed to the centre of the "hopper", so that surplus water overflowing at the rim is unlikely to entrain solids. In many instances the solid fed into the column may be mixed with a flocculant, the resulting increase in settling rate often reducing the area or height of the column required. To avoid wasting flocculant (which may be used to dose colliery slime), as the flocculant remains in the supernatant liquid and is preferably recirculated, fresh water may be fed into the lowermost cell of the column and a separate feed of flocculant and water may be provided to an intermediate cell, so that flocculated solids descending between these two feeds are stripped of surplus (re-usable) flocculant. The solids feed and withdrawal and the liquid withdrawal are as previously set forth.

Various means may be used for the removal of the solid at the bottom of the column, for example a simple constricted orifice, a circumferential thickener with a rake, a bell-and-hopper valve (as used for feeding blast furnaces) or the lower cell may have the form of a hopper with the restricted neck containing a screw extruder or a valve which opens for a set period in response to a sensor in the wall of the cell which detects the presence of solid at the level of the sensor.

Another means is as follows. The lowest cell may have a solids removal device comprising a detector which can sense whether just-fluidised solids have built up to at least a predetermined height, a flush water feed for keeping the solids just fluidised, and a pump (preferably a peristaltic pump) arranged to extract the just-fluidised solids from the lowest cell at a point below said height when the detector so senses. Preferably a second pump is provided, arranged to return liquid to the lowest cell at the same volumetric rate as the first pump extracts the just-fluidised solids, and may be a peristaltic pump operating in tandem with the first pump (if peristaltic). The detector may sense the hydrostatic pressure at one point below said height and one point above said height and be arranged to detect when the difference exceeds that attributable to clear liquids; these points may be connected to interconnected manometers having, say, a capacitance detector to detect the liquid level corresponding to the said pressure difference.

Means, such as transducers, strain gauges or even inspection windows may be provided to detect blockages or "dead patches" caused by build-up of solid on inoperative valves, and vibration of the valves or surges of treating liquid may be arranged to free the valves of excessive accumulations of solid, and also to clean the column, as a periodic maintenance measure.

As indicated above, the present invention is applicable to various forms of liquid-solid treatment. Although the liquid will in many cases be water it is also possible to apply the invention to the leaching of a solid with an acid or alkaline liquid. Thus a solid may be fed into the top of the column at one pH and by the introduction of liquid of appropriate pH at the base of the column the solid is leached as it falls through the column until it finally emerges at its base at the pH of the liquid. Alternatively this liquid may be fed in midway up the column and water at the base. Such a form of leaching requires a considerably reduced quantity of acid or alkali as compared with the usual practice of altering the pH of the whole pulp stream. Alternatively the liquid may contain a substance with which it is desired to treat the solid so that, for example, the invention may be employed for the mixing of flocculant with suspended solids. It need not always be the case that the liquid emerging at the top of the column is the desired material since the invention may be applied to the removal of unwanted material from a solid. One possible application is the removal of noxious liquors from solids prior to their disposal in order to avoid pollution of the environment by the liquid.

The invention will now be described by way of example with reference to the accompanying drawings, in which.

Figure 1:
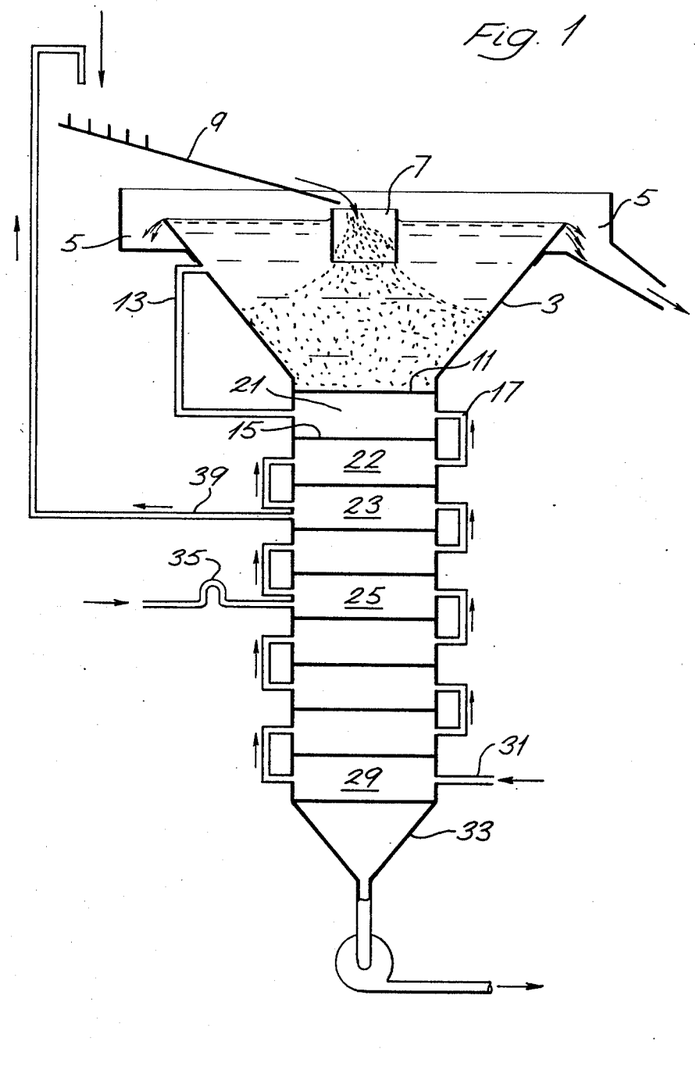
FIG. 1 is a diamgrammatic elevation of countercurrent decantation apparatus according to the invention.

In FIG. 1, a column opens out at its top end to form a hopper 3 having a rim 5 leading to an overflow and a central feed 7 issuing below the level of the rim 5. The feed 7 is supplied with solids which, in a zig-zag conditioner 9, undergo gentle agitation. As the solids enter the hopper through the feed 7, they tend to fall by gravity towards a horizontal divider 11 at the base of the hopper 3, and any liquid accompanying the solids through the feed 7 rises gently to the rim 5, having discharged its burden of solids, and overflows. The horizontal divider comprises a valve which opens to allow solid to fall through it when more than a certain amount of solid is on it and closes while there is still enough solid on it to prevent liquid passing through it in either direction. The valve will be described in more detail later.

The column 1 has several dividers identical to 11, serving to form a series of vertically stacked cells (for example a first cell 21 and a second cell 22, interconnected by a horizontal divider 15 and a liquid passage means 17). A pipe 13 carries liquid from the first cell 21 to the hopper 3, to above the maximum expected solids level, at a rate equal to that at which solid falls through the divider 11. This solid falls onto the divider 15, on its way being treated by the liquid in the first cell 21. The liquid flowing into the pipe 13 is replaced by liquid from the second cell 22, which enters through the pipe 17; the pipe entrances and exits are so positioned that neither pipe 13 nor 17 disturbs the operation of the divider 15.

When more than a critical amount of solid is on the divider 15 it opens to let solid fall into the second cell 22, but closes while there is still enough solid on it to stop liquid from the first cell 21 passing into the second cell 22. Obviously the liquid entrapped between the particles of solid passing through the divider will pass from the first cell 21 to the second cell 22, but there will be no bulk mixing of the liquids, and such entrapped liquid will be flushed out, i.e. diluted with second-cell liquid, with high efficiency.

This is repeated in every cell of the column 1, which as illustrated has nine cells. Into the ninth cell 29, clean water is introduced through a feed pipe 31, and as the water passes progressively from cell to cell up the column, it becomes progressively 'dirtier' (although the 'dirt' may, for example, be valuable solute which is to be recovered). Likewise, the solid descending progressively from cell to cell down the column becomes more and more thoroughly treated (e.g. rinsed), requiring progressively cleaner water to do the job, which requirement is automatically met in that the cleanest water is in the lowest cells.

The base of the ninth cell 29 may be a horizontal divider as already described, but a mesh or grille would suffice. Solid falling through this base enters a collection funnel 33 and is discharged by any wet-solid transport means.

An optional flocculant system may be 'bolted on'. Into the fifth cell 25 (or any other cell approximately midway), a feed 35 passes concentrated flocculant at a metered rate. Practically no flocculant will be left in the solid by the ninth cell 29. Solids in the next few cells above the fifth cell 25 will adsorb flocculant and thus by the third cell 23 the liquid will contain rather dilute flocculant. Accordingly, a liquid take-off pipe 39 passes a small volume of this rather dilute flocculant to the zig-zag conditioner 9.

Figure 2:
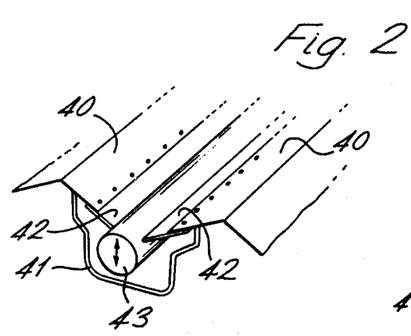
FIG. 2 shows a valve for use in the apparatus of FIG. 1.

FIG. 2 shows one divider (11 or 15 in FIG. 1). The horizontal area of the divider consists of parallel spaced aluminium ridges 40. Wire hoops 41 pass under the spaces at intervals. Each side of each ridge 40 has a rubber flap 42 riveted to its ridge. A cylindrical polypropylene rod 43, of specific density 0.80, is retained with some vertical freedom of movement within the hoops 41, such retention being especially useful when the apparatus is emptied of liquid. When the apparatus is full of water, the rod 43 tends to rise but is restrained by the flaps 42, which form a seal along the length of the rod. When solid falls on to the divider, it is channeled towards the rod 43 and, when enough is resting on the rod, the rod moves downwards, allowing solid to trickle between the flaps 42 and the rod. After a few moments, there will remain insufficient solid to depress the rod, which will therefore rise again and re-form the seal, while there is still enough solid to form a barrier against direct mixing of liquids on opposite sides of the divider. The resilience of the rubber allows a good seal even if there are some irregularities, such as pieces of grit lodged on the rod.

Figure 3:
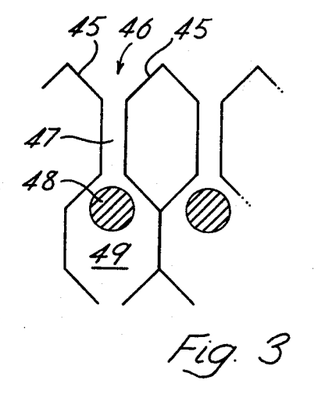
FIG. 3 shows another valve for use in the apparatus of FIG. 1.

In FIG. 3, another valve is shown, in section. Plates 45 channel solids 46 into a feed slot 47 sealed by a buoyancy cylindrical rod 48 retained in a chamber 49. When a sufficient height of solid has built up in the feed slot 47, the solid displaces the rod 48, falls past it into the chamber 49, and thence into the next cell below. The buoyancy of the rod 48 restores it to the slot-47-sealing position when there is still enough solid on it to stop liquid in the slot 47 from passing in bulk to the next cell below. Should some minor mixing accidentally occur, the liquid from the slot 47 will tend to remain in the chamber 49, thus leaving the next cell below substantially unaffected. In practice, the motion of the rod 48 is found to be a side-to-side wobbling.

Figure 4:
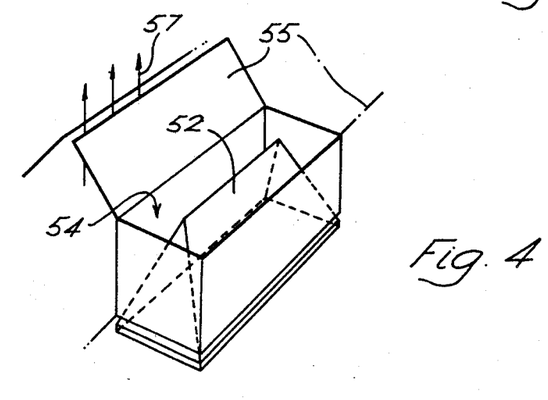
FIG. 4 shows yet another valve for use in the apparatus of FIG. 1.

In FIG. 4, yet another valve is shown in perspective. A buoyant member 52 having the shape of a hipped roof seals a rectangular opening 54 between cells. Guide plates 55 direct solids to the opening 54. The buoyancy of the member 52, which has a specific density of 0.55, is such as to seal the opening unless there is a weight of solid thereon, and to reseal it before all the solid has passed through it.

Between guide plates 55 of adjacent valves, there is a narrow gap through which liquid flows upwardly in a steady stream 57, in place of the pipes 17 of FIG. 1. The stream does not allow mixing of liquid from above with that in the lower cell, nor will solids fall through the gap. A similar arrangement could of course be applied to other forms of valve.

Figure 5:
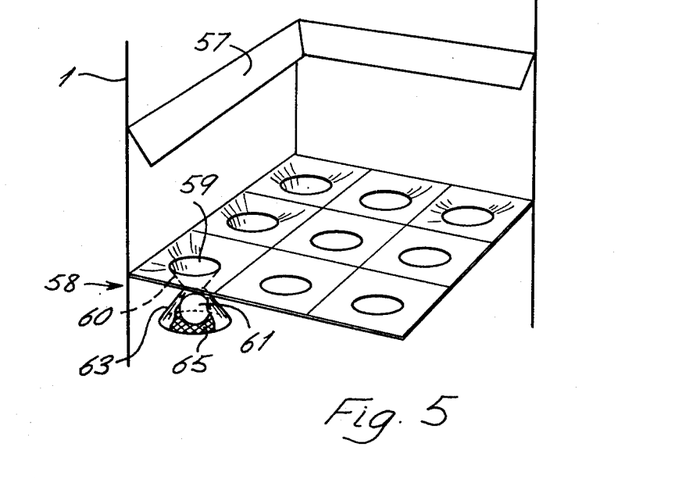
FIG. 5 shows a further valve for use in the apparatus of FIG. 1.

In FIG. 5, a further valve is shown in part-cut-away perspective form as part of a square-section decantation column 1. Deflector fins 57 prevent solid from chuting preferentially down the edges and upsetting smooth operation of the column. A valve system 58 has the form of a horizontal divider having nine circular dished apertures 59 in a square array, one being shown in greater detail.

The aperture 59 gives into a downwardly converging frustum 60 which, at a radius less than that of a buoyant sphere 61, opens into a downwardly diverging frustum 63 bounded at its lower end by a large-mesh wire grille 65. The sphere 61 has a specific density of 0.80 and is retained in the frustum 63. When a suffcent amount of solid has fallen through the aperture 59 and has built up in the frustum 60, the buoyant sphere 61 sinks from its position sealing the upper end of the frustum 63 and allows the solid to pass through the frustum 63 into the next cell below. The buoyancy of the sphere is however sufficient to re-seal the upper end of the frustum 63 while there is still a certain amount of solid in the frustum 60, enough to seal the valve system 58 against passage of bulk liquid through the valve.

Figure 6:
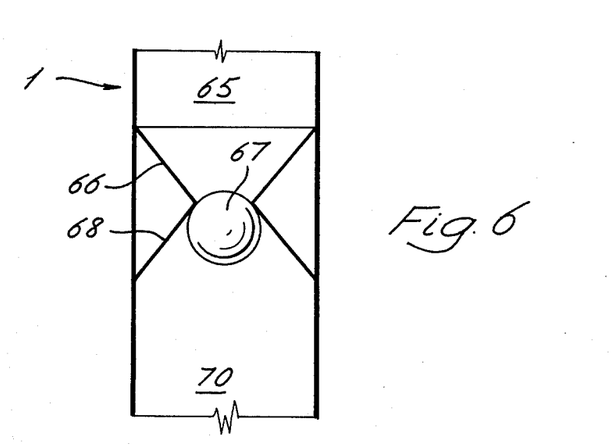
FIG. 6 shows yet a further valve for use in the apparatus of FIG. 1.

FIG. 6 shows a yet further valve in sectional elevation as part of a circular-section decantation column 1. An upper cell 65 terminates at its base in a downwardly converging frustum 66, which at a radius less then that of a buoyant sphere 67, opens into a downwardly diverging frustum 68 which extends to join the wall of the column 1. The sphere 67 has a specific density of 0.80 and operates as described for the sphere 61 of FIG. 5.

The specific density of the buoyant member may have to be altered depending on the specific solid and liquid in the decantation column, and experiments will reveal the best specific densities. The angles of the guide plates or frusta for directing solids onto the buoyant members may also be varied for best results, and the angle of frustum 68 in FIG. 6 (and corresponding members in the other Figures) should not be so small that the sphere 67 becomes immovably wedged in, nor so large that the sphere 67 is not reliably centered. Angles of 90° are a suitable starting point for trials.

Figure 7:
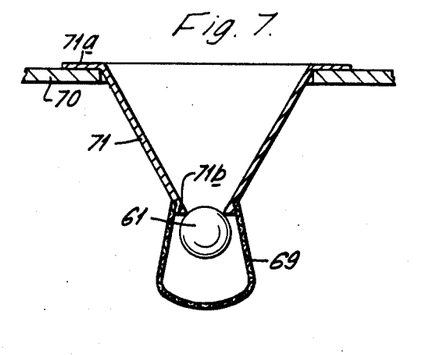
FIG. 7 shows a modified valve similar to that of FIG. 5.

FIG. 7 shows a modified valve, generally similar to that of FIG. 5. A buoyant sphere 61 cannot drop out of position because a restraining snap-on wire cage 69 is provided. A horizontal cell boundary plate 70 has round holes (only one shown) wherein there simply rests a flanged frustum member 71 (flange 71a) with, at its lower end, an external collar 71b over which the cage 69 can be snapped on or pulled off. Instead of round holes, square ones may be provided, with the flange 71a made appropriately large. A further alternative with square holes is for the member 71 to be pyramidal at its upper end merging into a true frustum at its lower end or being hopper-shaped somewhat as FIG. 4.

Figure 8:
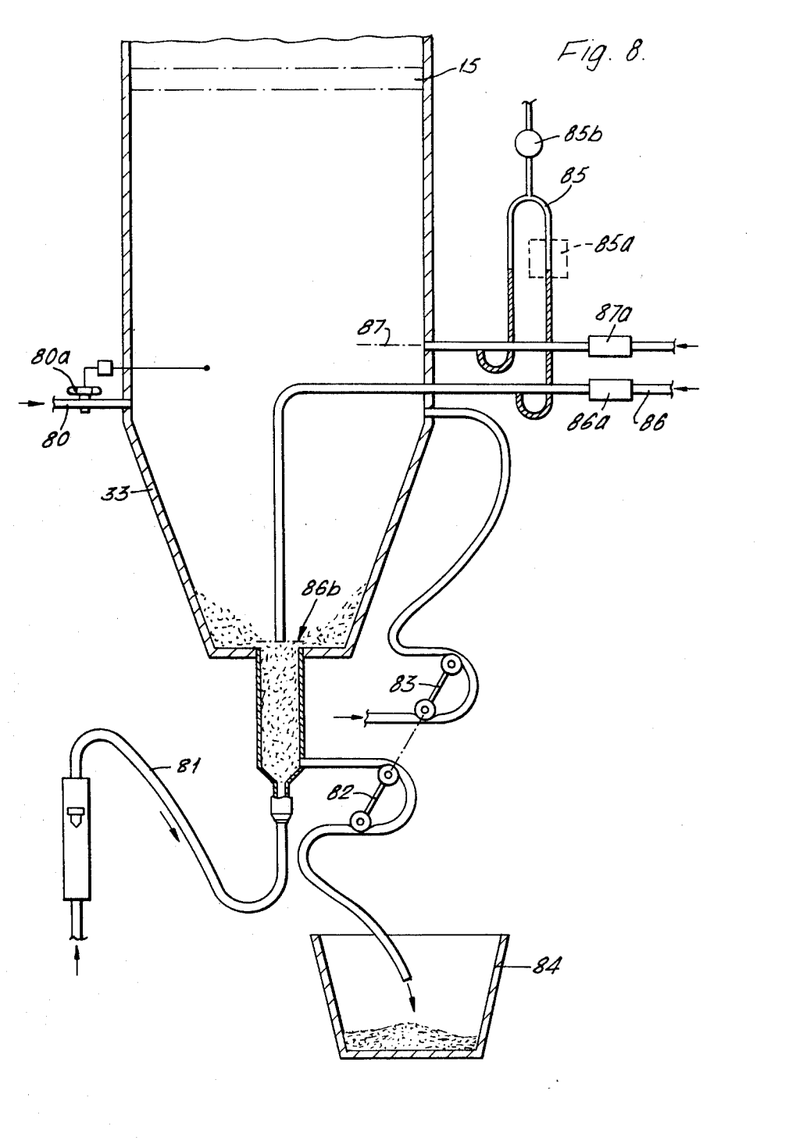
FIG. 8 shows a solids removal device which is located at the base of the apparatus of FIG. 1.

FIG. 8 shows a solids removal device for the lowermost cell of the decantation column of FIG. 1. Below the lowest divider 15, the collection funnel 33 has an auxiliary wash-water feed 80 controlled by a motorised valve 80a (heavily damped) responsive to increase the flow when sensing increased solute concentration in the funnel 33.

At the very bottom of the funnel 33, a flush-water feed 81 is set to keep any solids in the funnel in a just-fluidised state. A peristaltic take-off pump 82 for these just-fluidised solids runs in tendem with an identical peristaltic pump 83 (i.e. equal throughputs) to feed water to the funnel 33 to make up exactly the volume removed by 82, which delivers the desired solids into a bucket 84. The pumps 82 and 83 are switched to operate when liquid in a manometer arrangement 85 reaches the level of a capacitance detector 85a, and switch off when the liquid falls below that level. This liquid is in hydrostatic communication with a flush-water feed 86 controlled by a valve 86a to a constant rate of 0.5 liter per minute and issuing into the funnel 33 at a height 86b. The other branch of the manometer 85 is in hyrostatic communication with a point at a height 87, optionally having its own flush-water feed controlled by a valve 87a to a constant rate of 0.5 liter/minute. The manometer 85 is sensitive to changes in the pressure differential between the heights 86b and 87, and the capacitance detector 85a is positioned at the level which liquid in that branch reaches when this pressure differential exceeds that attributable to clear liquid, i.e. when solids start to build up to above the height 85b. The traps shown at the base of each branch of the manometer 85 are to prevent ingress of air. The quantity of air intentionally trapped in the manometer determines the "null" reading and is adjustable using a valve 85b.

Figure 9:
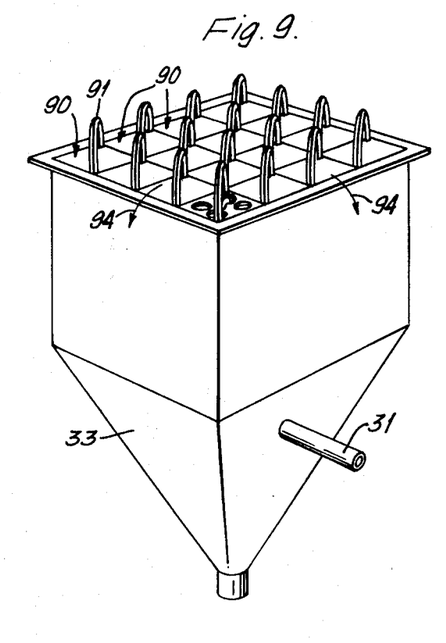
FIG. 9 shows a modular assembly forming the apparatus of FIG. 1.

FIG. 9 shows a modular assembly forming the apparatus of FIG. 1 below the hopper 3. References 31 and 33 correspond to FIG. 1. Spent flushing liquid may overflow over the edges as at 91. Sixteen upright modules 90 in a four-by-four array stand next to each other. Any one may be removed and replaced without disturbing the others; for this purpose each has a carrying handle 91. If a blockage occurs in any module, the module will weigh more, as the solids build up in it, and thus blockages can be detected by suspending each module by its handle 91 on a separate load cell. At their early stages, some blockages may be induced to clear by the expedient of clouting the handle 91 with a sledge-hammer.

Figure 10:
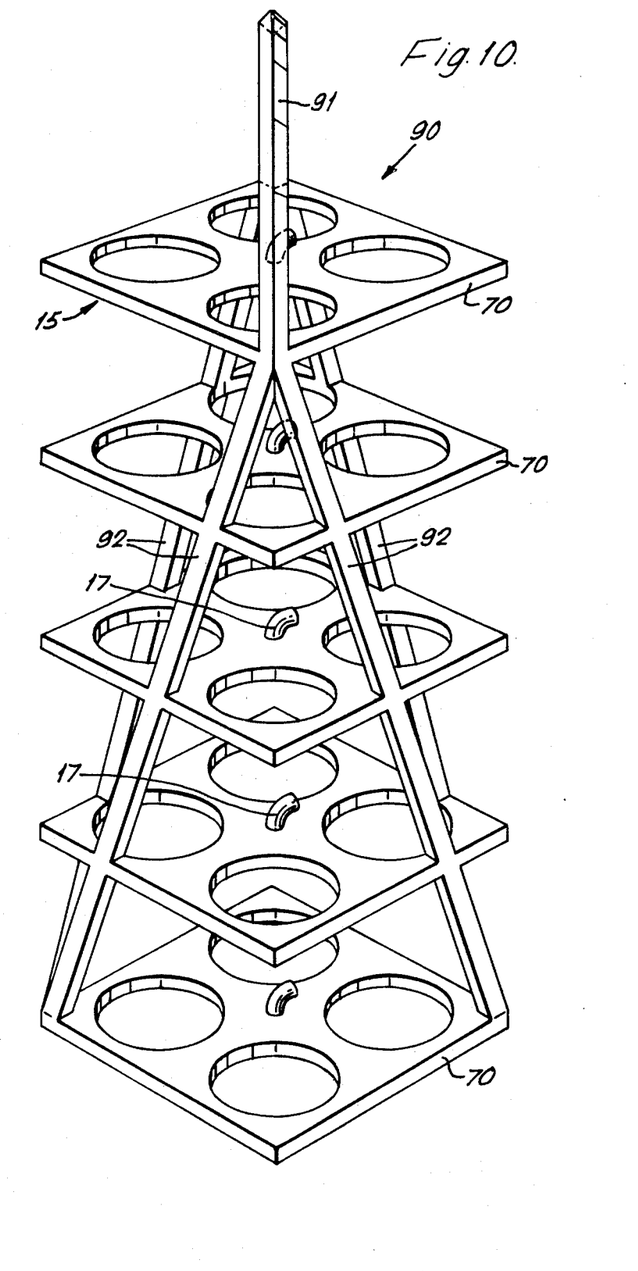
FIG. 10 shows one module for use in the apparatus of FIG. 9.

FIG. 10 shows a module 90 in more detail. The horizontal solids-sensitive dividers (15 in FIG. 1) each consist of a plate 70 (see FIG. 7) in each hole of which a valve rests as in FIG. 7. In all modules, the plates 70 will be at the same height, so that they together form the dividers 15.

Each end of the carrying handle 91 is welded to a pair of diagonal struts 91 at diagonally opposite corners of the top plate 70. The bottom plate 70 is supported by its other diagonally opposite corners, where respectively one strut 92 from each end of the handle 91 meets, and intermediate plates 70 are held along their edges as shown. The diagonal struts 92 form smooth rubbing contacts to allow one module 90 to be slid out from its neighbours. The liquid passage means (17 of FIG. 1) are each a short inverted-shoe pipe running through each plate 70 and terminating at their upper end in an oversize rubber flap (not shown) hinged at its top edge to allow liquid to rise via 17 but preventing solids from entering 17. Alternatively, some or all of the struts 92 could be hollow with suitable inlet/outlet ports to provide the liquid passage means 17.

I claim:

1. Countercurrent decantation apparatus comprising a first cell and a second cell interconnected by a valve responsive to the amount of solid thereon to open, for passing the solid by gravity from the first cell into the second cell, when more than a certain amount of solid is on the valve and to close while there is still enough solid thereon to prevent bulk mixing of liquid in the second cell with liquid from the first cell, the first cell and the second cell also being interconnected by a liquid passage means, said valve comprising a stationary structure and a buoyant barrier member, said buoyant member being of a form to enable accumulation of solids on the top thereof in cooperation with said stationary structure, so as to provide movement between an upper closed position attained in response to the buoyancy of said barrier member and a lower open position which is attained in response to downward pressure exerted by the weight of solid collected on the buoyant barrier member.

2. Apparatus according to claim 1, further comprising a third cell interconnected to the second cell by a valve responsive as already defined, the second cell and the third cell also being interconnected by liquid passage means.

3. Apparatus according to claim 1, wherein the buoyant member is a sphere which in the upper closed position obturates a circular aperture in a fixed structure.

4. Apparatus according to claim 3, wherein the fixed structure comprises an upwardly diverging frustum, whose smaller diameter is less than the diameter of the sphere.

5. Apparatus according to claim 4, wherein the lower edge of the frustum joins a downwardly diverging frustum.

6. Apparatus according to claim 5, wherein the downwardly diverging frustum terminates in a restraint to contain the sphere when the apparatus contains no liquid.

7. Apparatus according to claim 1 wherein the lowest cell has a solids removal device comprising a detector which can sense whether just-fluidised solids have built up to at least a predetermined height, a flush water feed for keeping the solids just fluidised, and a pump arranged to extract the just-fluidised solids from the lowest cell at a point below said predetermined height.

8. Apparatus according to claim 7, wherein the pump is a peristaltic pump.

9. Apparatus according to claim 7 further comprising a second pump arranged to inject liquid to the lowest cell at the same volumetric rate as the first pump extracts the just-fluidised solids.

10. Apparatus according to claim 9 wherein the first and second pumps are peristaltic pumps operating in tandem.

11. Apparatus according to claim 7 wherein the detector senses the hydrostatic pressure at one point below said height and at one point above said height and is arranged to detect when the difference exceeds that attributable to clear liquid.

12. A method of countercurrent decantation comprising the steps of:

passing a solid from a first cell containing said solid and a liquid to a valve having a stationary structure and a buoyant barrier member, said buoyant member being of a form to enable accumulation of solids on the top thereof in cooperation with said stationary structure;

permitting said buoyant barrier member to open in response to the amount of solids thereon when more than a certain amount of solid is on said buoyant barrier member;

passing said solid through said open barrier member of said valve and into a second cell containing said liquid;

permitting said buoyant barrier member to close in response to its buoyancy with respect to said liquid while there is a sufficient amount of solid on said buoyant barrier member to prevent mixing of said liquid in said first and second cells; and passing said liquid from said second cell to said first cell by means independent of said valve.

13. A method according to claim 12 further comprising passing the solid by gravity from the second cell into a third cell through a valve, and passing the liquid upwardly from the third cell into the second cell, by means independent of the valve, before passing the liquid from the second cell into the first cell, the valve being responsive as already defined.

14. A method according to claim 12, wherein all the cells are directly below each other.

* * * * *